United States Patent
Weatherhead

(10) Patent No.: US 8,564,660 B2
(45) Date of Patent: Oct. 22, 2013

(54) CHARACTERIZING DYNAMIC REGIONS OF DIGITAL MEDIA DATA

(75) Inventor: James J. Weatherhead, San Diego, CA (US)

(73) Assignee: Eye Tracking, Inc., San Diego, CA (US)

( * ) Notice: Subject to any disclaimer, the term of this patent is extended or adjusted under 35 U.S.C. 154(b) by 0 days.

(21) Appl. No.: 13/429,224

(22) Filed: Mar. 23, 2012

(65) Prior Publication Data

US 2012/0236143 A1 Sep. 20, 2012

Related U.S. Application Data

(63) Continuation of application No. 11/594,040, filed on Nov. 6, 2006, now Pat. No. 8,155,446.

(60) Provisional application No. 60/733,586, filed on Nov. 4, 2005.

(51) Int. Cl.
*H04N 7/18* (2006.01)
*H04N 5/14* (2006.01)

(52) U.S. Cl.
USPC .......................................... 348/135; 348/571

(58) Field of Classification Search
USPC ........... 382/103, 173, 181; 345/156; 600/558; 348/135, 571
See application file for complete search history.

(56) References Cited

U.S. PATENT DOCUMENTS

| | | | |
|---|---|---|---|
| 6,608,615 B1 * | 8/2003 | Martins | 345/156 |
| 2003/0072374 A1 * | 4/2003 | Sohm | 375/240.16 |

* cited by examiner

*Primary Examiner* — Amara Abdi

(74) *Attorney, Agent, or Firm* — Mintz Levin Cohn Ferris Glovsky and Popeo, P.C.

(57) ABSTRACT

A media analysis tool is provided for defining dynamic regions of a digital media segment. The dynamic regions may contain at least part of a visible feature of the segment. Correlation of the defined regions with external data quantifying attention of a subject viewing the segment to locations on the screen provides measures of interest level and attention to visible features in the segment. The dynamic regions may be defined in only some of the frames of a segment. The dynamic region may be interpolated or extrapolated for frames in which it is not explicitly defined.

20 Claims, 9 Drawing Sheets

| Stimulus | Index of Cognitive Activity |
|---|---|
| Local News | 3.93 |
| Television Show Teaser | 5.44 |
| Television Show | 4.45 |
| Commercials (Average for this set) | 3.35 |
| First Benchmark Logo | 4.43 |
| Second Benchmark Logo | 4.30 |
| Movie Promos | 3.42 |

FIG. 6

CHARACTERIZING DYNAMIC REGIONS OF DIGITAL MEDIA DATA

RELATED APPLICATIONS

This application is a continuation under 35 U.S.C. §120 of U.S. patent application Ser. No. 11/594,040 filed on Nov. 6, 2006 and issued as U.S. Pat. No. 8,155,446 on Apr. 10, 2012, which claims the benefit of priority from U.S. Provisional Application entitled "CHARACTERIZATION OF DYNAMIC REGIONS OF DIGITAL MEDIA DATA", filed Nov. 4, 2005, Application Ser. No. 60/733,586, the disclosures of which are both incorporated by reference in their entireties.

TECHNICAL FIELD

The subject matter described herein relates to the characterization of dynamic regions of digital media data.

BACKGROUND

Content analysis and tracking of specific regions of digital media have applications in a variety of fields including advertising, computer training programs, and interactive content in Internet based web sites.

Eye tracking is a technique used to determine where a person is looking. In brief, the movements of a subject's eyes are tracked while the subject is presented with various visual media. Further information may also be gleaned from observing and quantifying other movements and changes in the pupils as the subject observes specific sub-aspects of a visual stimulus.

Test stimuli are images or other media that may be presented to test subjects for the purposes of gauging subject interest in one or more aspects of a stimulus. Various techniques exist for identifying a specific region or regions of a given test stimulus that attract attention from a subject viewing it. Advertisers, web page designers, and other creators of marketable content may use test stimuli with one or more test subjects to improve visibility of a desired brand or product placement, or to test the impacts of different media layouts on the emotional response of those viewing them.

SUMMARY

In a first aspect, a dynamic region is defined in one or more frames of a digital media segment. The dynamic region may contain at least part of a visible feature in the one or more frames. A relationship is analyzed between the dynamic region and an external data set collected from a subject or subjects viewing the digital media segment. One or more metrics indicative of a subject interest level in the visible feature are reported.

In various optional aspects, the digital media segment may be incorporated into a digital media presentation, and may further be displayed in a random order in the digital media presentation. The random order may be determined stochastically. The external data may be eye-tracking data recorded for the test subjects, or it may be one or more of cognitive activity, cognitive engagement, and emotional response measurements. A second external data set comprising cognitive activity, cognitive engagement, and/or emotional response measurements may also be analyzed in relation to the dynamic region and additional metrics related to cognitive activity stimulated by the visible feature may be reported. The dynamic screen region may optionally be defined using pattern-matching algorithm that automatically produces a mathematical definition of a screen region containing at least part of the visible feature.

In further optional aspects, one or more additional dynamic regions may also be defined in the digital media segment, and a relationship between these additional regions and the external data set may be analyzed. Additional metrics indicative of the subject interest level in these additional regions may be reported. Alternatively, metrics may be reported relating to the intersection of one or more additional dynamic regions with each other. A state of the dynamic region on a frame in which the dynamic region is not explicitly defined may be predicted based on interpolation from the one or more frames in which the dynamic region is defined.

In a second interrelated aspect, a digital media segment that includes a plurality of frames may be displayed to a subject. A data set including screen locations gazed at by the subject is recorded while the subject views the segment. A display frame is selected from the plurality of frames, and the data set is plotted in conjunction with the display frame to produce a snapshot of the screen locations gazed at by the subject while the subject viewed the digital media segment.

In various optional aspects, the snapshot may include a still image of the display frame overlaid with a series of connected points that show the screen locations gazed at by the subject while viewing the plurality of frames. In one optional aspect, a dynamic region that is non-static in the plurality of frames may be defined in the digital media segment. The data set may be correlated to the dynamic region such that the snapshot reflects a measure of subject attention to the dynamic region throughout the plurality of frames. In another option aspect, the snapshot may include a still image of the display frame overlaid with an intensity plot that indicates an amount of time that the subject's gaze fell within one or more regions on the display frame. Additional data recorded while displaying the digital media segment to one or more additional subjects may be aggregated into the data set and plotted in conjunction with the snapshot.

In a third interrelated aspect, a visible feature that is displayed in a digital media segment is identified. A first screen region that contains at least part of the visible feature in a first frame of the digital media segment and a second screen region that contains at least part of the visible feature in a second frame of the digital media segment are defined. A definition of a third screen region that contains at least part of the visible feature in a third frame is predicted based on the definitions of the first screen region and the second screen region.

In optional variations, the first screen region may be defined by specifying a first location of a vertex point of a polygon in the first frame while the second screen region may be defined by specifying a second location the vertex point in the second frame. A third location of the vertex point in the third frame may be interpolated based on the first and second positions of the vertex. The third frame may appear between the first and second frames. The first screen region may be defined using a pattern-matching algorithm to automatically produce a mathematical definition of the first screen region that contains at least part of the visible feature.

In other optional variations, the digital media segment may be displayed to a subject and a metric pertaining to a location of subject attention in the third frame may be recorded. The location of subject attention in the third frame may be compared with the predicted definition of the third region to estimate subject interest in the visible feature.

In a fourth aspect, a plurality of segments may be defined in a digital media presentation which is presented to one or more subjects. External data related to reactions of the subjects to the segments may be recorded and correlated to the plurality of segments to determine subject interest in each segment of the plurality of segments. In an optional variation, the external data may be one or more of subject cognitive activity, subject cognitive engagement, and subject emotional response.

Additional interrelated implementations include articles that include a machine-readable medium that stores instructions operable to cause one or more machines to perform the above-described operations. A computing device may optionally include a machine readable medium the stores these instructions. This computing device may operate to perform one or more of the operations described above.

DESCRIPTION OF THE DRAWINGS

This disclosure may be better understood upon reading the detailed description and by reference to the attached drawings, in which:

FIG. 6 is a table showing an example data output format for relating subject cognitive activity data with digital media segments;

DETAILED DESCRIPTION

Figure 1:
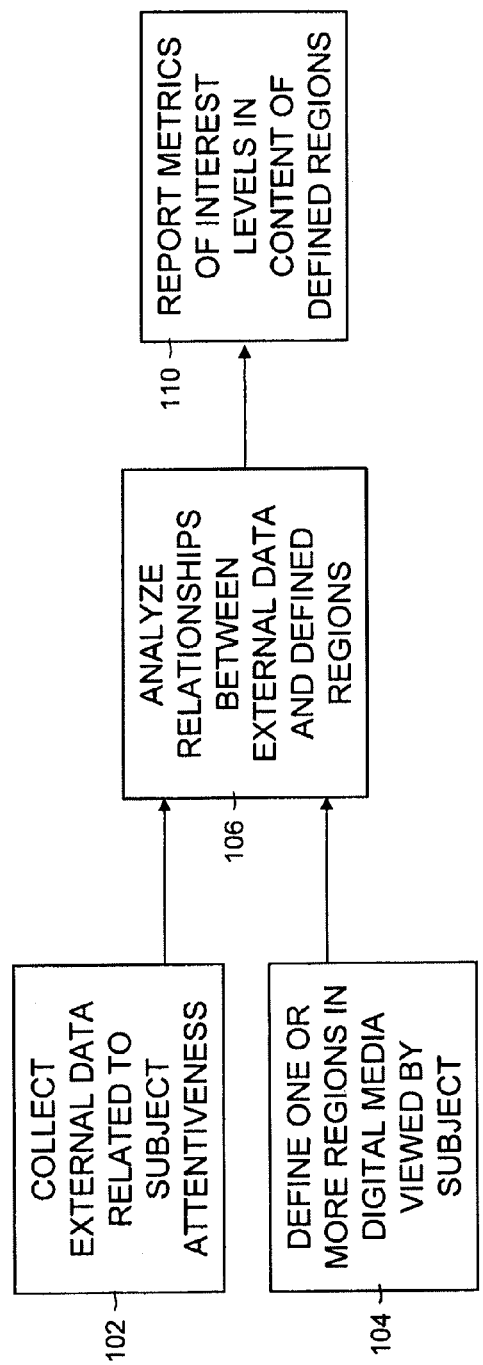
FIG. 1 is a process flow diagram illustrating a first implementation of a method for analyzing digital media.
Figure 2:
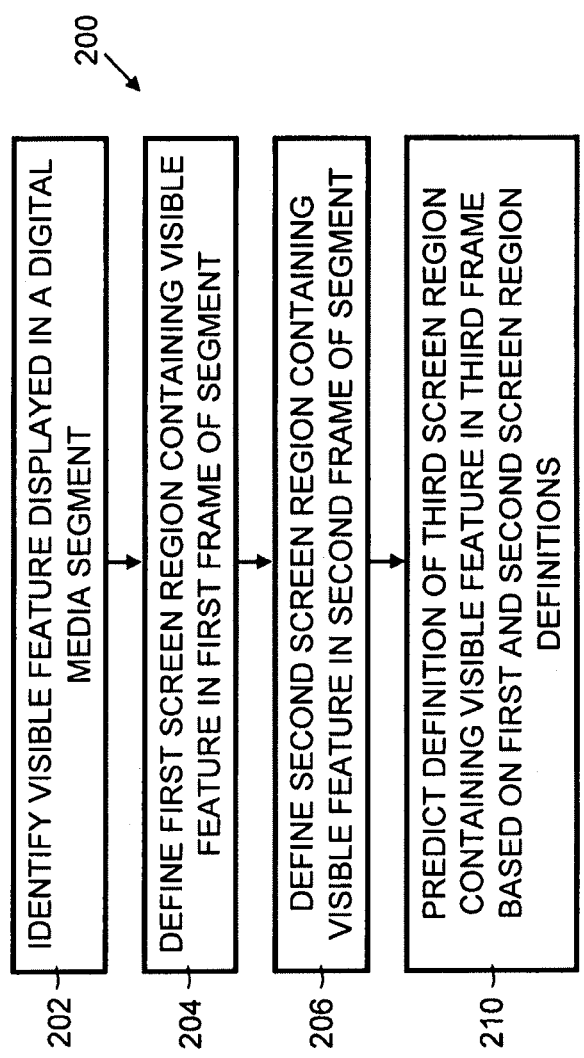
FIG. 2 is a process flow diagram illustrating a second implementation of a method for analyzing digital media.

This disclosure relates to a media analysis tool (MAT) that may be used for a variety of applications. As an illustrative example, a MAT as disclosed herein may generate a "target" piece of digital media from one or more other (or "original") pieces of digital media. Digital media may be analyzed to ascertain where a viewer or viewers looked on the screen and how those data correlate with visible features of the digital media. Digital media not generated by the disclosed subject matter may be analyzed as well.

The disclosed subject matter allows segments of video, as well as regions within a video image, to be defined. Segments are pieces of video footage, such as for example a TV commercial or a news report. Regions may be regarded as elements within the video image area, such as for example a news reporter's face, a product being displayed during a commercial, or the like. The defined regions need not be correlated to any visible feature of the digital media presentation.

Output data regarding segments and regions that have been defined or identified in a video stream may be generated using the disclosed subject matter. These output data may be compared and/or correlated with other regions or segments, optionally of the same video stream or of other video streams. Additionally, external data collected from other sources may be correlated with the region and segment information. Examples of such external data include eye-tracking information for a viewer of the video or other information related to movement of an input device such as a computer mouse or stylus by a viewer. Eye tracking data may include one or more of gaze direction or a location on a screen where a subject's attention is focused, pupil movements and dilation, eyelid separation, gaze direction when blinks occur, blink duration and frequency, divergence of right and left eye gaze directions, and saccade or fixation of a subject's gaze. Eye tracking information may be recorded by commercially available "eye-tracking" hardware that indicates where one or more viewers are looking at a given moment in time. By integrating information such as eye-tracking data into the analysis, metrics for viewer attentiveness to various parts of visual media questions may be estimated. Such metrics may include a comparison of the length of time a region is visible on the screen vs. how much time a viewer or viewers spent looking at that specific region of the video, and the like. Output results may be of a statistical nature, although other types of output are within the scope of the disclosure as well.

Digital media as discussed herein includes video media, audio media, and any combinations thereof. Video is not limited to two-dimensional projections, nor is the format of the audio or video media in any way restricted. The terms digital media, media, video and audio are regarded as one and the same for the purposes of this disclosure. Where any of these types of media are discussed in the form of a digital file or recording, it should also be realized that live or buffered digital streams of audio and video media could also be used in these instances In some implementations, the disclosed subject matter may be used in connection with marketing research. For example, a researcher may wish to analyze eye-tracking data for a TV commercial that includes a brand symbol for the product being advertised. Research questions may include, for example, whether a subject viewer saw the brand symbol in the commercial, how many times did the subject viewer looked at the brand symbol, the length of time that the brand symbol held the viewer's gaze, the length of time the brand symbol was shown on the screen, and the size of the brand symbol in either absolute terms or relative to other on-screen images at the time the brand was visible. While this example discusses a single viewer watching a video clip, in most cases, the researcher may be interested in either aggregating or comparing the results of more than one person in a research study. The technique applies equally to single subjects or groups of participants, regardless of whether such results are displayed in a serial fashion or in an aggregated fashion.

Similarly, in some implementations, the results of one or more persons in different demographic subsets may be compared. For example, it may be desirable to compare the results of all female respondents against those of all male respondents. The constraints for forming subgroups are unbounded, but typically, the researcher may be interested in separating results into groups such as gender, age, income, ethnicity, geographical location, purchasing habits, academic qualification, job description, and the like, as well as various combinations thereof. As in any analysis of demographic data, a single subject need not be exclusive to one group. For example, a subject may be a member of a group containing all female participants and also a member of a group that includes all people earning an annual salary over $50,000.

In addition to allowing data to be compared across multiple subjects, such as for example when external data are analyzed, the presently disclosed subject matter also allows data to be compared across screen regions. If for example, there are three people's faces on screen during a TV commercial as well as two company's logos, it may be desirable to investigate the amount of viewing attention that goes to one or more of the faces in comparison to the amount of viewing attention directed to the logos. This analysis may be performed either irrespective of which logo or which face, or for each specific logo and each specific face. This information may be generated by correlating the region information with the eye-tracking data of one or more viewing subjects. For studies in which eye-tracking data of more than one person is used, the results may be further separated by demographic subsets as discussed above.

Another aspect of the presently disclosed subject matter is the ability to prepare multiple pieces of test media that may be used in a marketing research or similar study. In many studies of this type, randomizations are incorporated into the test media to ensure valid results during the analysis phase. The ability to sequence aspects of digital media according to one or more stochastic techniques is also within the scope of this disclosure. Throughout this disclosure, "stochastic" refers to both fully randomized selection and to pseudo-randomizations performed using one or more statistical algorithms. Statistical design methods, such as for example Latin Square and Greco-Latin Square methods may also be utilized.

In one implementation that is illustrated in the method flow chart 100 shown in FIG. 1, external data are collected for one or more subjects while the subjects are viewing a digital media segment 102. The external data pertain to a measure of the subjects' attentiveness to one or more visible features of the digital media presentation. One or more screen regions in the digital media segment viewed by the subject or subjects are defined 104. The relationship, if any between the external data and the defined regions in the digital media segment are analyzed 106, and one or more metrics of subject interest in the content of the defined regions is reported 110.

As noted above, the term "segment" is used herein to describe a subsection of media. A segment may be a subsection of a longer media file or it may be the entire media file. A segment may be defined by at least two time markers: a start time and an end time. These two markers can be described either in absolute time or in time relative to some event or the like intrinsic to the video or media file, such as for example the start of the file or alternatively the appearance of a visual or audio cue in the file or video. In one example, segments may be defined by at least a start time and an end time, and where more than one segment is defined, a unique segment identifier. Duration of the segment may also be used to define the end point. Other attributes may also be included with a segment such as a reference to a media file with which the segment is associated. This information, in its most simple form, may be entered manually through an input form in an implementation of the subject matter. Alternatively, identification and naming of segments may also be automated.

The behavior of an automated process will, in many cases, be specific to the type of video that is targeted by the automation algorithm. Existing techniques may also be included in the system. An example of a technique for flagging the start and end of different kinds of video media, such as for example commercials, in a video stream by locating sequences of black frames in the video signal, is described in Sadler D. A., Marlow, S., O'Connor, N., Murphy, N. "Automatic TV Advertisement Detection from MPEG Bitstream," which is incorporated here by reference. A sequence of black frames are typically inserted both between individual TV commercials and between TV commercials and non-commercial video segments. Another example of a method by which segments may be identified includes monitoring the video signal across time. If some threshold number of pixels, such as for example approximately 70%, change within a predefined amount of time, such as for example approximately 30 milliseconds, then it could be determined that a segment ends and the next segment begins.

A segment may be defined for each piece of video or other media of interest. Typically a segment may be defined for each TV commercial, or movie, or TV program contained within a video However, there are no constraints as to what constitutes a segment. Each segment may be given a unique segment identifier by which it may be referenced at a later time. If more than one segment is defined in any one video, segments may, or may not, overlap one or more other defined segment.

In videos or other digital media containing known audio or visual signals, image recognition or pattern matching algorithms may optionally be used to identify the onset or offset of the signal. Hence a start or end marker for a segment may be inserted at that point. In one example of this process, an audio signal between certain frequencies may be sought to identify when a person is speaking, and each start and stop of the "in-range" frequencies may be marked as a new segment. Similarly, segments may be defined that contain certain images, or colors of interest, such as for example times when the color red is present on screen, or use image recognition or pattern matching algorithms to identify when people's faces, or a particular product. In another example, a change in audio level or pitch could also mark the onset or close of a segment.

Video is generally viewed as a whole. For example the full picture is visible to the viewer as is the case with televisions. In some instances, such as marketing research studies, it is often beneficial to obtain information pertaining to specific subsections of a video being viewed. For example, during a TV commercial for a product, it may be of interest to know such information as: how long does a given product appear on a screen, how many times does it appear on a screen during a given period, what is the average size of the product (or its visual representation), what was the location of the product and the like. Regions may be used to track specific visual elements of interest within a video.

The term "region" is given to a defined area within video data. Each region may or may not be associated with a defined segment within a video. If a region is associated with a defined segment of video, that region's lifetime is the duration of its parent segment. Any number of regions from zero to many may be defined for any given segment or segments.

Typically, a graphical subject on the video with which a particular region is associated may move with time. For example, a news presenter's face will move around the screen during a newscast. For this reason, a region's attributes may be changed at different times throughout its lifetime. The attributes that may be set for any given region include, but are not limited to: size of the region; position of the region; shape of the region; and visible state of the region. Each region may be given a unique region identifier by which it can be referenced at a later time. Regions may be identified and their attributes defined through manual or automatic techniques, or through some combination thereof.

One example of a method for identifying and tracking regions within a digital media segment utilizes a technique called keyframing. Each segment may contain one or more keyframes. A keyframe defines the state of one or more regions for a given frame of a digital media segment. In one example a keyframe may generally contain three or more points that define the shape of a region. Three points are the minimum number required to define a closed polygonal shape. The time chosen to insert a keyframe for a region is independent of any other keyframe whether for the same region or any other region in the segment. However, for any one region, only one active keyframe may be inserted at a given time. In other words, a region may not be defined in two different areas of a single frame.

Once a complete list of keyframes for a particular region is built, a region in the digital media file, video, etc. may be interrogated for its state at any given time within the region's lifetime. The state of the region between that region's keyframes may be computed using a series of different techniques.

A keyframe may be posted for every single frame on a video, if desired. This action would be equivalent to defining a unique region on every single frame such that no prediction of the location, shape, etc. of the region would be required for any given frame. This process would be quite laborious as each frame in a segment would need to be analyzed to define a region that contained at least part of each visible feature of interest. A less labor intensive process includes defining regions only on more sparsely scattered keyframes through the segment. When an interrogation time is chosen that falls on one of the region's keyframes, the attributes of that specific keyframe may be returned. However, if a keyframe is not defined for an interrogated frame, a prediction is made of the region's attributes in the interrogated frame. In one example, this prediction may be an interpolation based on the state of the region in keyframes occurring earlier and later than the interrogated frame. The interpolation process may most simply use a linear function. Other functions may also be applied, such as for example nearest neighbor, B-spline interpolation, and the like.

In one implementation, a method such as that shown in the flow chart 200 may be used to track a visible feature that appears in a segment of digital media presentation. In this example, the visible feature is identified globally in the segment 202. This identification may be manual or automated based on one or more algorithms for image recognition or pattern matching or the like. A first frame of the segment is selected for keyframing and in it a first keyframe is defined for a screen region such that the first screen region contains at least some portion of the visible feature 204. A second frame of the segment is selected for keyframing and in it a second keyframe for the screen region is defined such that the second screen region contains at least some portion of the visible feature 206. As an example, if the segment is a television commercial, the visible element may be an advertising logo or even a sample of the product being advertised that is shown on screen. For a third frame of the segment that does not contain keyframe data explicitly defining a region containing the visible element, a definition of a third screen region is predicted based on the first and second screen region definitions associated with the first and second frames. As noted, the prediction may be an interpolation. In one example, this interpolation is linear.

Figure 3:
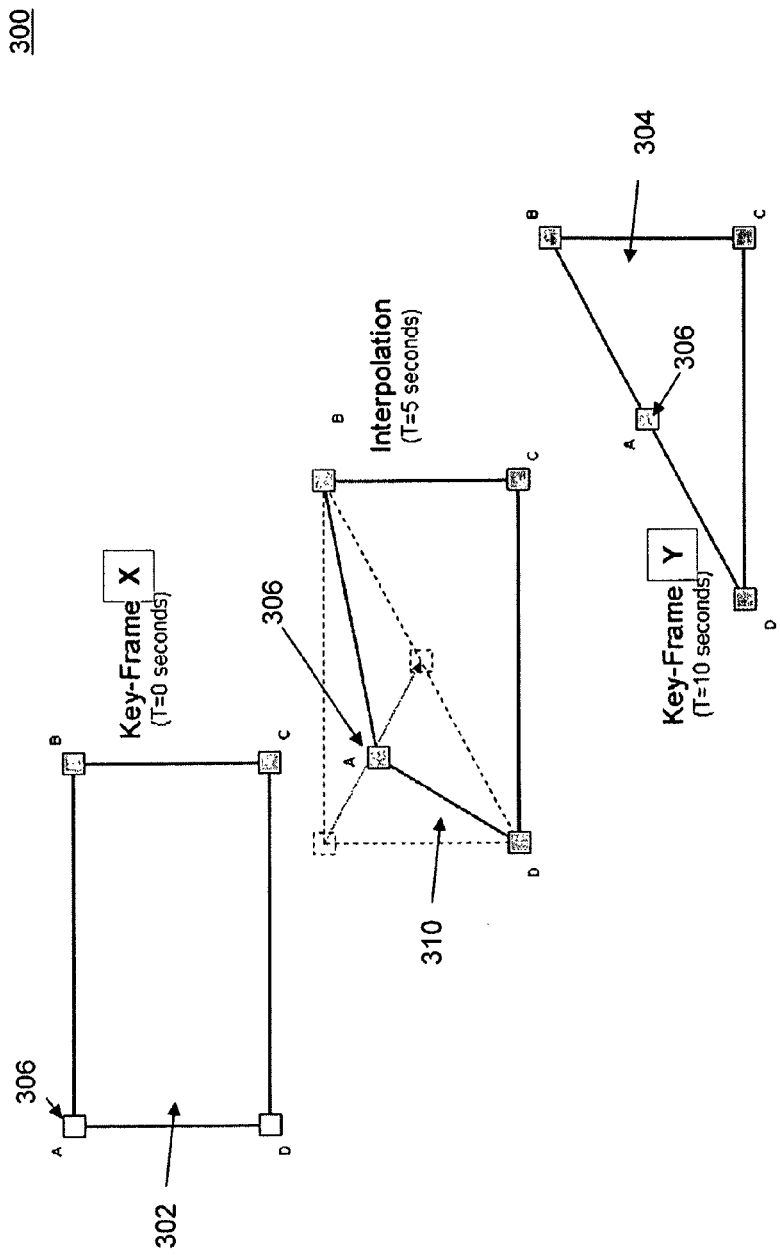
FIG. 3 is a diagram illustrating an example of a method for predicting a definition of a region using keyframe information from other frames.

For an interrogation time that falls precisely half-way (in time) between two keyframes (A and B) for a given region, the standard linear interpolation function in would be as follows. All points within the keyframe A are to be mapped to its peer in keyframe B. The position of each point will then become positioned at the point precisely half-way between its position in keyframes A and B. FIG. 3 is a diagram 300 that demonstrates this behavior. Keyframes X 302 and Y 304 are set 10 seconds apart, where only the position of point A 106 changes in keyframe Y 304. If the region's position is interrogated at time=5 seconds 310, point A's 306 position is now precisely located half-way between its position in its two neighboring keyframes 302, 304.

Each point that makes up a keyframe may be defined in either two or three dimensional space. Similar interpolation techniques apply in both situations. It should also be recognized that while the foregoing description addresses defining absolute positioning for a given keyframe, "transformations" may also or alternatively be provided for keyframes. In this manner, positioning of a keyframe may be described in terms of translations relative to positions in neighboring keyframes. For example, instead of stating that point B is located at coordinates 10,132 at time=5 seconds, point B may be translated by (3, 4) units from its previous keyframe at time=5. With either technique, the similar interpolation methods may be used. Other techniques may be used as well to define a keyframe. For example, a velocity vector may be defined for a point on a region or the whole region itself, and this velocity vector may be used to predict the position of one or more points on the region or the entire region itself over subsequent frames of the digital media segment. Any such technique that facilitates prediction or inference of the position of a region or one or more points within the region in a frame that does not include keyframe information is within the scope of the present disclosure.

Linear interpolation is discussed above as an illustrative example. However, it will be readily appreciated that any other interpolation method or technique may be applied within the scope of this disclosure to predict the definition of a region. Additionally, the prediction need not be an interpolation. In an alternative example, an extrapolation of the definition of a region in a frame may be made. Extrapolation may introduce a larger error in the predicted state of a region in a given frame than would interpolation. However, for a region that moves either very little from frame to frame or that moves with a very consistent, regular trajectory between frames, it may produce acceptable and usable results while lessening labor requirements by reducing the number of individual frames that need to be keyframed.

Another attribute that may be set on a per keyframe basis is the visibility of the region, or a subset of the region's points. This attribute may be interpolated. However, it may also be handled setting a region's visibility to that of the last keyframe from the time it is interrogated. By setting the region's visibility to "hidden", any analysis performed on the region will show the region as "off-screen" during this period. By only hiding some of the region's points, the number of points used to define the region at any given moment in time may be increased or decreased, the amount of time taken to define a region's keyframes may be reduced. Reducing the number of points that define a region reduces the number of points whose positions may need to be predicted to define the region in an interrogated frame that does not contain keyframe information. Other attributes that may be interpolated or extrapolated based on information recorded in one or more keyframes include color, trajectory vectors, transparency, and the like. These attributes may be defined for either an entire region or one or more vertices of a region. Prediction of these attributes for non-keyframed frames may be accomplished using interpolation or extrapolation as discussed above.

In addition to being defined by a series of keyframes, regions may also each have a unique identifier, which may be any combinations of numeric or alpha-numeric characters, graphics, or the like that may be used to distinguish one region from any other.

Automatic identification of regions may be desirable for many reasons. Automatically defined regions may be defined in less time than in the aforementioned "manual method." Additionally, regions may be automatically defined in real-time, as well as in semi- or near real-time. In other words, it is possible to define regions from live or streamed video sources either as the video is viewed or closely thereafter. This capability enables processing of the data in real-time or near real-time and also may facilitate correlation of external data with regions in real-time. Real-time correlation could be used to first detect whether or not a viewer saw some automatically defined region and then immediately issue a message to some other system, or record some log entry, or perform some similar action in real-time or near real-time. An example scenario could a security guard tasked to watch a security monitor for intruders. The computer detects movement in a video signal and identifies the region of the video that the movement is in, the system notices that the security guard did not look at the region after some period of time and hence triggers an alarm and automatically calls the police.

Algorithms used to detect the regions may operate in a variety of ways. For example, an algorithm may look for and define areas on the video that match some pre-defined pattern such as a shape, color, size, image or the like. Alternatively, an algorithm may look for and define areas on the video that have moved from the last frame or some other frame in the same video sequence. In this manner, the algorithm tracks and define moving objects. Combinations of these methods or others with comparable effect may be used as well.

Various algorithms are available that may be used to detect images within video and audio signals. The selection of an algorithm may be based, in part, on the information to be analyzed. For example, some techniques may be better at detecting moving objects over a white background, whereas others may be more appropriate for detecting a person's face in a TV commercial and other such complex environments. Examples of algorithms used to detect objects within video signals include image recognition or pattern matching algorithms, neural networks, edge detecting algorithms, template matching, frame-by-frame comparison algorithms, and the like.

While the aforementioned description of regions addresses the use of points to define a region, it is also possible to use other mathematical techniques to define region(s). For example, a region may be defined as "a circle of radius 3 units." While the points that make up the region are not explicitly specified, analysis on this shape may be accomplished using general mathematical principals. For an example in which a region's keyframes are defined by geometric descriptions of mathematical functions, interpolation may still occur in the manner specified above. An illustrative example involves a circular region's radius changing from 2 units at time=0 seconds to 4 units at time=10 seconds. The result of the interpolation at time=5 seconds is a circular region with radius=3 units.

Video-editing programs facilitate defining and splicing of segments of a video or multiple videos together into one resultant video. While these tools are useful for production of movies and the like, they may not be as useful for more specialized applications. For example, in a marketing research study, one or more subjects may be interviewed or have eye-tracking data collected after and/or while they are shown subject videos or audio. A study design may be utilized that will limit or eradicate any biasing in the results from the study. One common cause of biasing in the results of a study such as this is due to "ordering effects." The responses given by a subject regarding one piece of video or audio may be influenced by what the subject saw or heard at some point earlier in the sequence of test materials he or she views during the study.

To eliminate ordering effects in scientific studies, the order of presentation of test stimuli is often randomized. Randomization ensures that different subjects see test material in different orders, or even that different subjects are exposed to completely different stimuli from others. Implementations of the presently disclosed subject matter may include functionality to aid researchers in the generation of randomized test data, allowing test material to be generated, labeled, and organized more rapidly and efficiently than currently available methods.

Various algorithms may be utilized to enable automatic generation of test material. These algorithms may include the 'Latin Square' methodology as well as other randomization algorithms.

In one implementation, a number of participants in a given study is established, and one or more segments are defined or set to be automatically defined prior to commencing the randomization process. Optionally, other information may be entered including criteria definitions that limit the resultant media to be generated. A specific randomization algorithm may be chosen as well. Using a combination of the number of participants in the study, the randomization algorithm, the number of segments (manually defined or otherwise as described above), and taking into consideration any criteria (for example a hypothetical requirement that segment 1 must not ever follow segment 2) one or more resultant media are generated for use in a study. A lookup algorithm for determining which study subject should see which newly generated piece of test media may also be provided. This lookup method may be, for example, a lookup data file matching a unique media file to a participant identifier, a particular location on a hard drive, a certain filename configuration, a combination of these or other methods, or another similar method.

The presently disclosed subject matter also allows users to define a presentation order manually by defining multiple segments. These segments may be associated with any one video. Alternatively, each segment may come from different videos, or any combination thereof. A list may then be created by the user that describes the order in which the material is to be presented to each subject or subjects. Each segment may be referenced by its unique segment identifier. An example of this file could be as simple as: Segment Identifier: Segment 1|Segment 5|Segment 2. In one implementation, the definition of segment 1 may be examined and the chosen piece of media may be extracted from the file and linked to segment 1. Segment 1 is then written to the beginning of the new resultant test material. In this illustrative example, the same procedure would be followed to define and extract first segment 5 and then segment 2 and add these segments to the resultant material in the specified order.

Randomization files, each file containing information as above, may be utilized that are intended for presentation to different subjects. In this case, a program or method implementing the disclosed subject matter may loop through each file, generating a different resultant file for each subject. The resultant files may be uniquely marked as it is created, for example using a file name, a path on a computer-compatible storage medium, or via a generated lookup table. By reference to the identifier, the proper files may be presented to the intended test subject or subjects. The above description discusses creation and storage of media test videos as digital files on a computer-compatible storage medium, such for example a magnetic or optical storage device, flash memory, random access memory (RAM), or the like, for both random and manual randomizations. It is also possible, and within the scope of the disclosed subject matter, to skip the writing of the test material to a storage medium, for example as individual files, and to simply play the segments live from a source file or files, and in the specified order during actual testing.

Once segments have been defined, information specific to those segments may be output. This information may include but is not limited to: a unique identifier of the segment, a name of the segment, duration of the segment, the start time of the segment, and unique identifier(s) for regions associated with the segment.

Information may also be output regarding regions once they are defined in the system, whether the region definition is accomplished manually, automatically, or by a combination of such methods. The outputted information may include, but is not limited to: a region's unique identifier, position, shape and/or size of the region at any given time, velocity and direction of travel of the region at any given time, visibility of regions at any given time, color and pattern information of video graphics contained within regions, and intersection information between region and other regions. Similar information may be made available for one or more individual points of a region as well. Intersection information between regions may include, but is not limited to a specific point or points at which regions cross and/or overlap, the duration of the overlap or intersection, and the frequency or number of repetitions of the overlap or intersection. Any of these data may be analyzed, aggregated, processed in any manner consistent with data collection. For example, averages, counts, and other statistical measures may be computed, derivatives may be computed, and correlations both within the data and with external may be performed. Summaries may also be computed such that region information may be computed against that of other regions. These derivatives may be computed on some arbitrary timeframe, per defined segment basis, or by any comparable metric.

Using the capabilities disclosed herein of determining regions at any given time point in a media file or presentation, intersection testing may be performed between one region and another, between one region and multiple other regions, between multiple regions and multiple regions, and between one or more regions and other external data. These external data are data that have some link to position within a displayed frame. The external data may also include time and shape information. One example of external data that may be used are eye-tracking data. Eye-tracking data are composed of discrete samples collected for either one or two eyes. In one example, each eye-tracking data sample contains at least an x position, a y position, and the time that the sample was collected. Each collected data sample may be evaluated to identify whether the sample falls within any of the defined regions that are visible at that time.

The eye-tracking data used in analyses disclosed herein may be either data pertaining to the viewer's left eye, right eye, or a combination of both eyes, such as for example an average of the two eye's positions. The eye-tracking data used may also be a subset of the full data set actually collected, such as for example a subset including only samples that indicate where the subject was looking while a button was depressed. The eye data may also be correlated with other physiological measures such as measures of cognitive activity, cognitive state, cognitive workload, level of engagement, affective responses, arousal and excitement. Eye-tracking samples may be filtered out from the analysis if any combination of these measures fall below or exceed some predetermined threshold, or the value of any combination of these measures may be associated with each, or a subset of, the eye-tracking samples. Physiological metrics may then be correlated with which regions are being viewed, and how they are being viewed.

Other external data that may be used, include but are not limited to input device actions, such as for example mouse clicks or stylus movements, any other eye-data including fixations, saccade, blink and foveal field of view information, and the like, as well as any other psycho-physiological information including information acquired from devices such as ECG, EEG, EKG, FNIR, respiration information, EMG, pupilometry, fMRI, MRI and Galvanic Skin Response. Correlations may be performed with external data that is being fed live to the system, or external data being fed from a previously recorded and archived source.

Output of results from the above analyses may be configurable and scalable to enable an optimal presentation and understanding of those results. Two potential result output modes are visual representation and textual/numerical representation. Textual results may be presented in any number of formats, such as for example, in columns, where for example the first column labels the output and the second column is the value of the result, or in phrases such for example "region 1 was on screen for 5 seconds, it was viewed for 10% of the time it was on screen."

Figure 4:
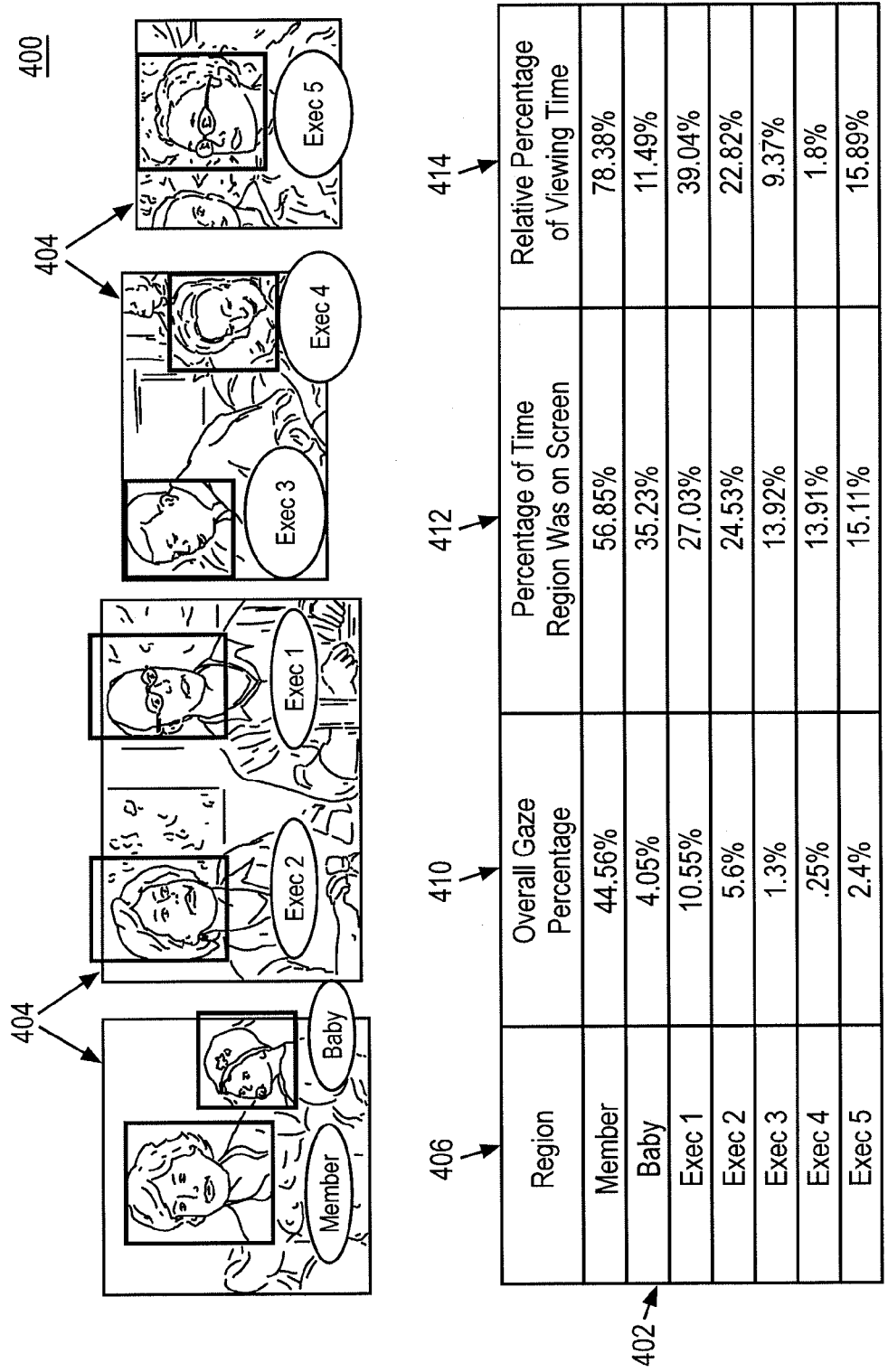
FIG. 4 is a diagram showing an example data output format for relating subject viewer gaze data and frame regions.

One example of a data output report format 400 for data generated using the presently disclosed subject matter is shown in FIG. 4. This report format includes a table 402 and several captured frames 404 from the digital media presentation shown to the test subject or subjects. In this example, screen regions are labeled in a descriptive manner: Member, Baby, Exec 1, Exec 2, Exec 3, Exec 4, and Exec 5. The captured frames 404 provide a visual cue to identify the labeled screen regions. As the captured frames 404 show, in this digital media segment, the seven regions are not all on the screen concurrently. Methods, techniques, and articles providing the capability to identify and track the screen regions are described below. The columns in the table 402 shown in the example of FIG. 4 include "Region" 406, which lists the region names given above, and "Overall Gaze Percentage" 410, which indicates the percentage of the total viewing time during which each region held the subjects' gaze. In this example, the digital media segment had a duration of 29.97 seconds, and it was watched by nine subjects whose gaze directions were tracked while they viewed the segment. Additional columns shown in the table 402 are "Percentage of Time Region Was on Screen" 412, which indicates the fraction of time relative to the entire length of the segment that the identified region or a part thereof was visible onscreen, and "Relative Percentage of Viewing Time" 414, which indicates the fraction of the total time that the region was onscreen that it held the subjects' attention. The "Overall Gaze Percentage" value is the product of the last two columns in the table 402.

Figure 5:
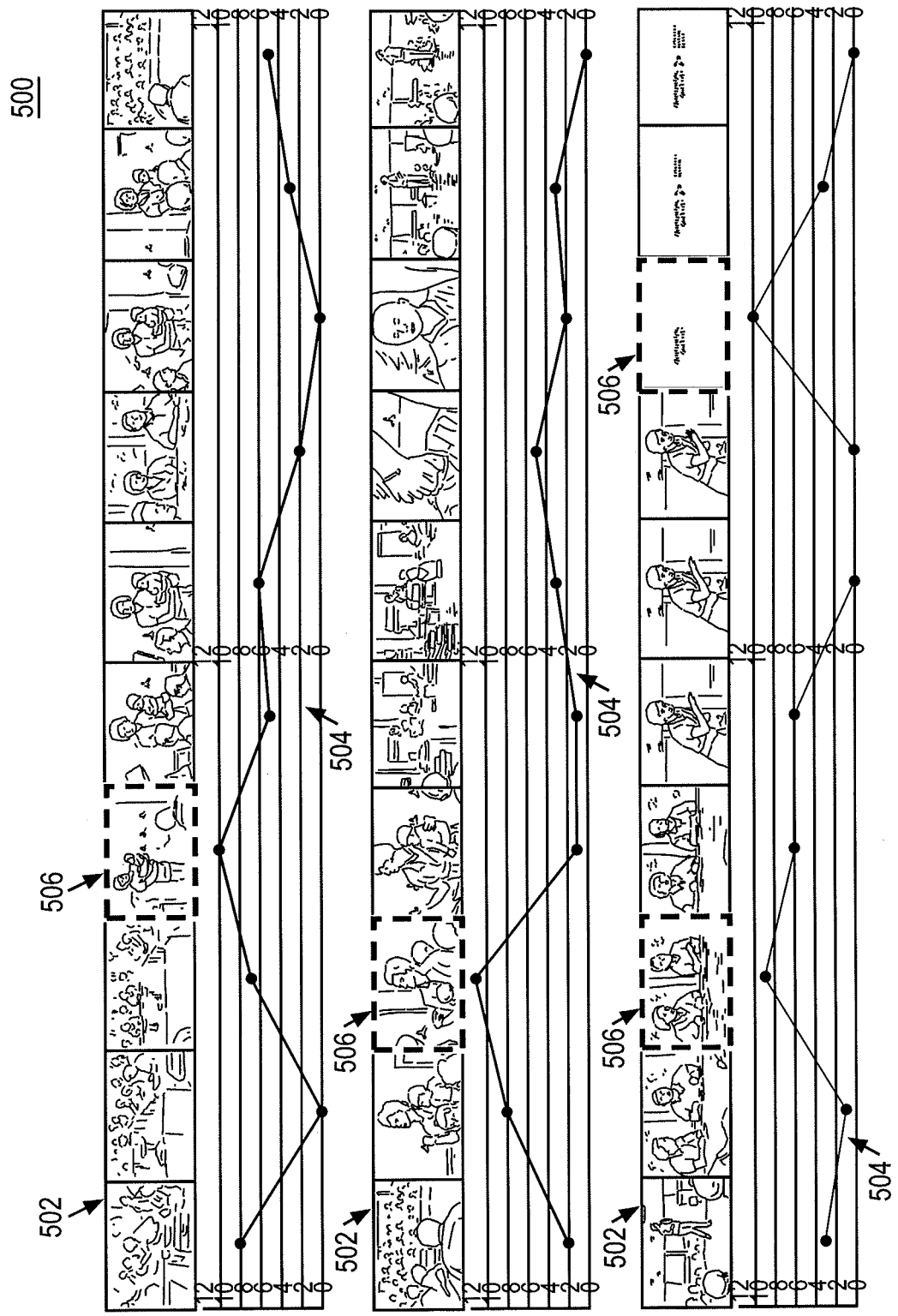
FIG. 5 is a diagram showing an example data output format for relating subject cognitive activity data to frames.

An example of a graphical data output report format 500 for data generated using the presently disclosed subject matter is shown in FIG. 5. This report format includes a series of captured still frames 502 taken from a digital media segment. Beneath each row of captured frames 502 is a chart 504 showing a value of an index of cognitive activity that was measured and correlated with the captured frames 502. This report 500 thus graphically indicates frames of a digital media presentation that are more engaging. The report 500 in FIG. 5 identifies four frames 506 with bolded borders that showed particularly high levels of engagement relative to the remainder of the digital media presentation and which may thus be examined in greater detail using one or more other reporting formats that may drill down into the collected data to illustrate what aspects of the subject matter shown in the more engaging frames may have caught the subject's attention. In one example, cognitive activity may be measured by monitoring and recording the point of gaze and pupillary response of a subject to a task or visual stimulus. An example of such a measure is described in U.S. Pat. No. 6,090,051 which is hereby incorporated by reference in its entirety. Other methods of estimating the cognitive activity of a subject viewing a video or other digital presentation may be utilized.

Cognitive activity data may also be presented as shown in the report format 600 shown in FIG. 6 which includes a table 602. In this example, a digital media presentation including a number of video segments is shown to a number of subjects whose index of cognitive activity is measured during their viewing. The cognitive activity data are correlated with the individual video segments, which are listed in the first column 604. Analysis of the cognitive activity data yields a metric indicative of the level of engagement experienced by viewers for each portion of the presentation as shown in the second column 606. To eliminate bias in the results, the segments in the presentation may be randomized prior to presentation to each subject. In this manner, history effects in the data may be minimized.

Additional reporting formats may present graphical data on a static image captured from the digital media segment or presentation. The static image may be a frame from the video that was viewed at a given time, captured from the video, and altered in some manner to depict the results of the analysis. Examples of alterations that may be performed on the image include but are not limited to color coding areas of the image where the color of the image pertains to a value of the data, alpha blending techniques can also be incorporated, and the like. In another example, results can be output in a video format. Video output of data may allow data to be presented in context that makes understanding of the results easier. Examples of video outputs include overlaying of information over the top of the test video or videos such that the overlay displays regions and possibly visualizations of external data (eye-tracking data and psycho-physiological data.

In another example, data may be output as one or more frames from the test video (whether that is one media file or sourced from several media files), effectively presenting snapshots of the video at selected moments in time. In one example, the times that the snapshots are taken may be separated by some predefined period of time, specific moments in time chosen by the user, specific moments in time chosen by a system implementing aspects of the disclosed subject matter, and specific moments in time chosen when a given external data source meets some pre-determined condition, such as for example a when cognitive workload or some other physiological measure exceeds a given threshold or eye-tracking data detects the viewer looking at a given region. In one example, specific moments may be chosen automatically such as for example due to items detected in the video signal using simple pixel comparisons, image recognition, or pattern matching algorithms, or the like.

Figure 7:
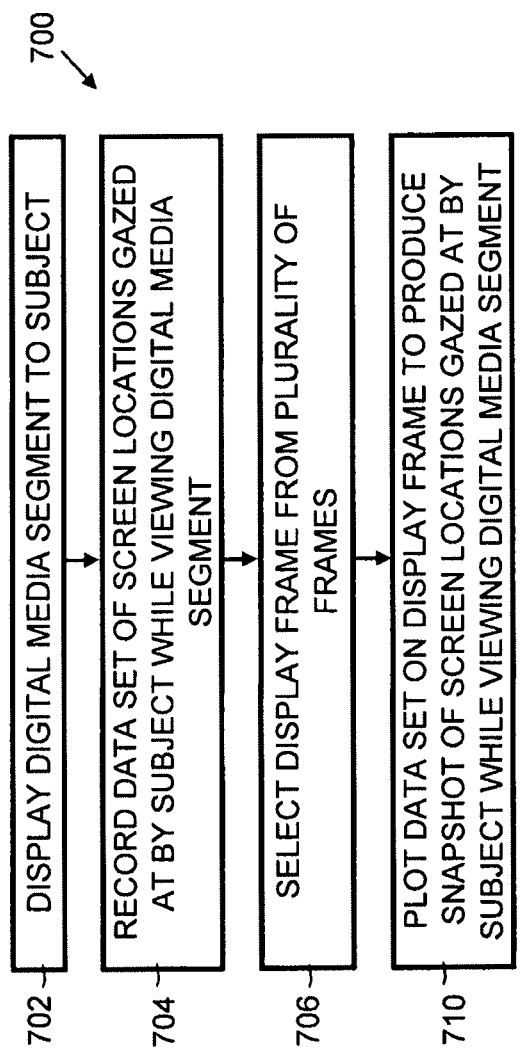
FIG. 7 is a process flow diagram illustrating a third implementation of a method for reporting media analysis data.

FIG. 7 shows a process flow diagram 700 that illustrates an example method for outputting data from an analysis of external data. A digital media segment is displayed or presented 702 to a subject or subjects. The digital media segment generally comprises a series of series of frames that the subject views. Data, such as for example eye-tracking data, pertaining to the locations on the screen that the subject or subjects gaze at while viewing the digital media segment are recorded 704. A display frame is selected from the series of frames 706. The display frame may be used as a backdrop on which the recorded data set is plotted 710. In this manner, a snapshot is provided of screen locations viewed by the subject while watching the series of frames in the digital media segment. Alternatively, the recorded data may be presented in a display that includes the display frame with additional information presented around or outside of the frame boundaries.

The output regions may be written onto separate images, or several images may be written onto one or more composite images, for example images containing one or more frame grabs within them. Output formats may also be utilized in which a snapshot is used to present a depiction of one or more identified regions with summary analysis of one or more data sets associated with each region. The summary could be, for example, an analysis of data collected at the time the snapshot was taken, or alternatively for an entire segment of the digital media presentation in which the region was tracked. Analysis results may be drawn onto the display frame itself, or they may alternatively be drawn around the outside of the display frame.

Visual depictions of one or more external data sets that correlate with the video may also be output. These external data sets may include measures of subject cognitive activity, subject cognitive engagement, subject emotional response, or the like. The resultant image generated for the external data may be written into or displayed by itself, or may be paired with any of the image representations output in the storyboard functionality. Examples of two illustrative outputs formats 300, 400 are shown in FIG. 8 and FIG. 9.

Figure 8:
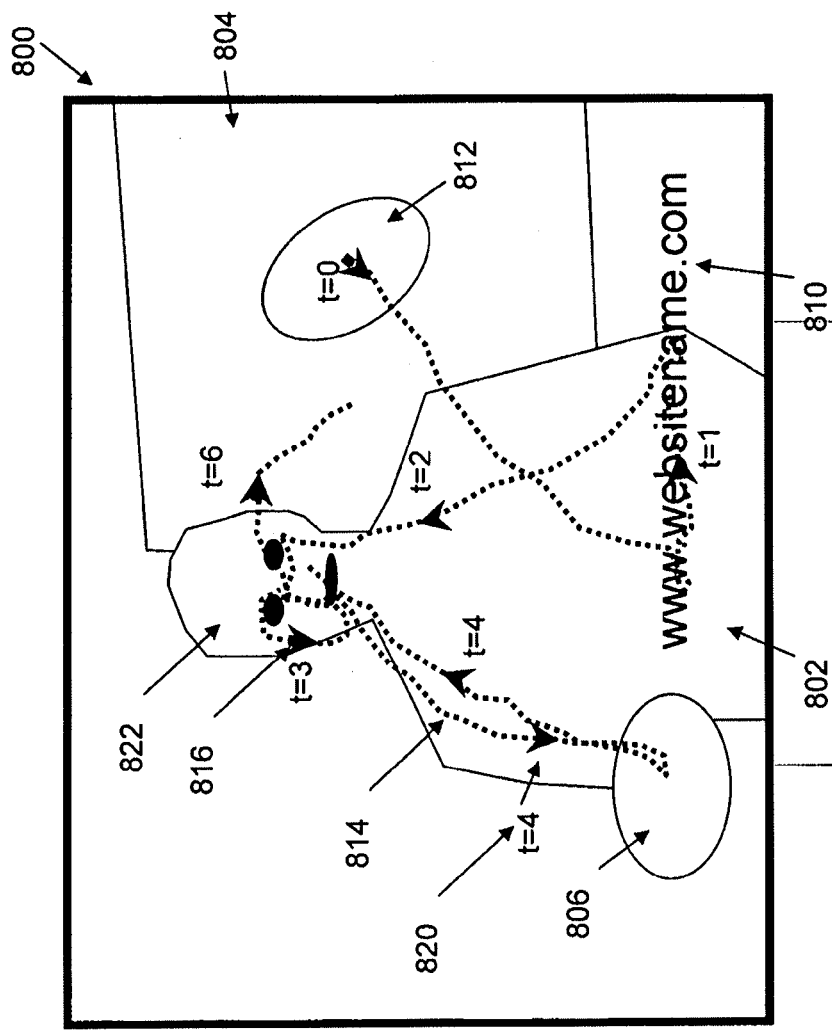
FIG. 8 is a diagram illustrating a first example of a graphical data output report.

FIG. 8 is a rendition of a frame 800 from a video segment. The frame contains an announcer 802 standing in front of a video monitor 804. Also shown on the screen in this frame are logo 806 and a website address 810 superimposed in front of the announcer 802. The content being displayed on the video monitor 804 in the background includes an additional instance of a logo. All of this content was visible to a subject when the subject viewed this frame in sequence with the other frames in the video segment. While the subject was viewing the segment, eye tracking data were collected at the rate of one data point per frame that indicates a point on the screen where the subject's eye were pointed during that frame. To present these data in a manageable and understandable condensed format, the frame shown was selected from the segment to be a display frame 802. A trace 814 connecting the eye tracking data points collected while the subject viewed the video segment is superimposed onto the display frame. The trace 814 may be accompanied by some indication of elapsed time to indicate how the subject's eyes moved around the displayed scene as a function of time. In this example, arrows 816 are added on the trace to show direction of the subject's eye movement along the trace and time indicators 820 are also shown to indicate the speed with which the subject's eyes moved. In the display frame shown, the subject's eyes began at the logo 812 displayed on the video screen 804 in the background behind the announcer 802 and then proceeded to the website address 810 before moving to the announcer's head 822, down to the foreground logo 806 and back up to the head 822. The data in this example are shown as a trace representing eye movement. However, the data need not be presented as a trace. A wide variety of graphical representations, including but not limited to histograms, scatter plots, intensity charts, bar charts, and the like may be used.

Figure 9:
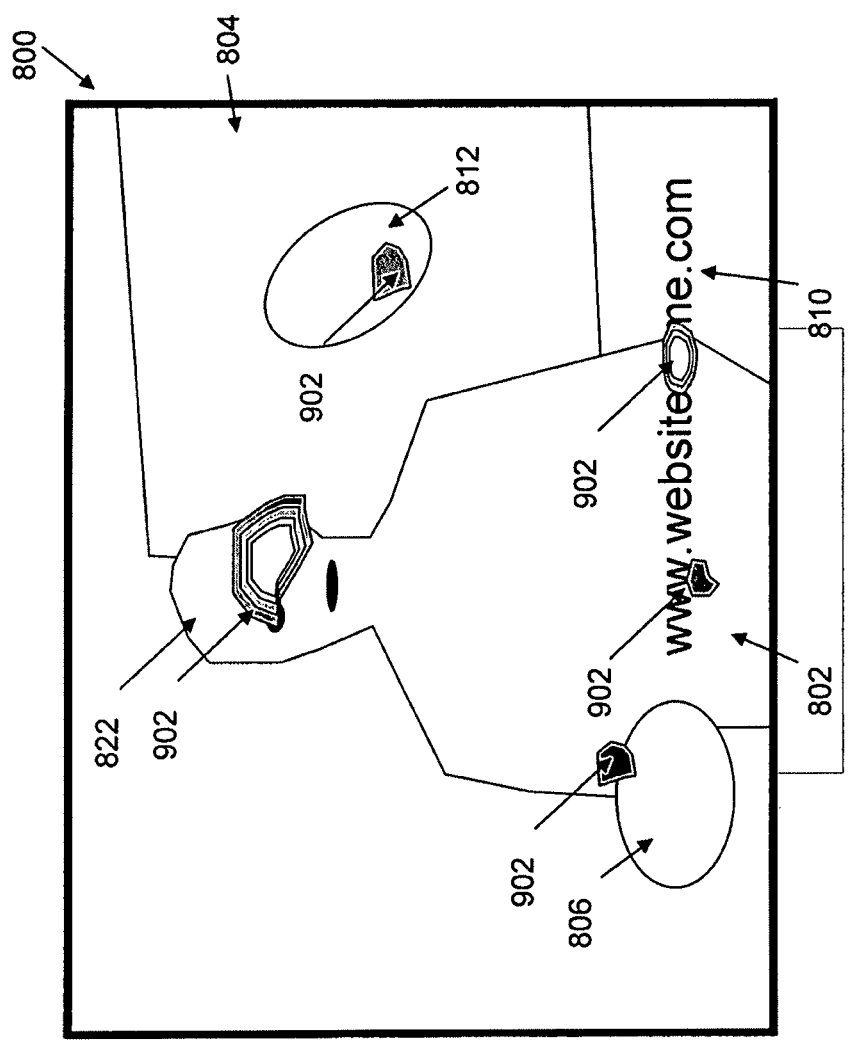
FIG. 9 is a diagram illustrating a second example of a graphical data output report.

FIG. 9 shows the same frame 800 containing the announcer 802, background video screen 804, foreground logo 806 and website address 810, and video screen logo. In this example, intensity plots 902 are overlaid on the frame image in the display frame to indicate the amount of time that a subject or subject remained attentive to various regions of the frame. In this example, the most attention was directed to the region including the announcer's head 822 and the region including part of the website address. Additional hotspots of viewing intensity may be seen on the two logos 806 and 812.

Generation of visualizations from one image or video to produce any other image or video (to depict data), may be accomplished by a variety of programming methods may be used. In one implementation, the original video or image is directly drawn, or "Witted" with a visual representation of the data to be incorporated into the final image. This technique has the effect of replacing the values of the original image with those of the data to be incorporated and may change only part or the whole of the original source image/video. The visual representation of the data to be incorporated in the final representation may alternatively or additionally use a technique called alpha blending. This technique permits the data visualization to be "blended" with the original video or scene image resulting in a highbred of the two. Depending on how this technique is used, the result may be that the original video/image appears unedited, it may look as though the incorporated data visualization has replaced some or all of the original video/image (as in the overlay method), or it may look as though the two have been smoothed together (giving an effect of transparency to the overlaid data), or some combination of all of these.

In the above-described implementations, the source video/image(s) may be changed to show the presence of data, or perhaps to show the lack of data, or a combination of data. In either case, data may be represented by the use of one or more colors, blurring may be added to an image, and in the case of the "blended" technique, alpha levels (the amount of transparency used) may be utilized to depict data. In some cases, combinations of these techniques may be used. While most results will be generated once all data of interest is available, it is also possible to perform analysis on the fly. In other words, visualizations of data may be made as the data are collected. This capability may be useful in applications such as for example in training environments where a supervisor can monitor a student's interaction with a system interface by watching the student's screen with overlaid eye information showing where the student is looking and, in one option, data related to one or more cognitive workload or other psycho-physiological measures. The supervisor may be able to intercede with the training session to advise the student on what, if any, information was ignored, disregarded, or not given an adequate amount of attention. If the session is recorded in conjunction with correlated external source data, the session may be replayed to the student to demonstrate errors. The recorded session may also be used to investigate aspects of the training interface that might not be as effective as they were designed to be.

This implementation could also be taken a step further for use in a similar manner for on-the-job training. Automatic region detection may be used to scan the video as seen by the viewer. If the system locates and defines a region of interest, such as for example an image of an x-ray image of a bag at a security checkpoint, and detects that the viewer's eye or eyes did not view that region, a real-time trigger may be fired to a supervisor or to the x-ray system itself to take some action. Techniques such as this may be performed with any combination of video and external data (including eye-tracking data, mouse data, and psycho-physiological data).

Various implementations of the subject matter described herein may be realized in digital electronic circuitry, integrated circuitry, specially designed application specific integrated circuits (ASICs), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) may include machine instructions for a programmable processor, and may be implemented in a high-level procedural and/or object-oriented programming language, and/or in assembly/machine language. The programs may be packaged, sold, or otherwise provided to users via a network or as part of a machine-readable medium such as for example any computer program product, apparatus and/or device, including but not limited to magnetic discs, optical disks, random access or read only memory, flash memory, programmable logic devices (PLDs). Such machine readable media may be used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the subject matter described herein may be implemented on a computer having a display device, such as for example a cathode ray tube (CRT) or liquid crystal display (LCD) monitor, for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback. Input from the user may be received in any form, including but not limited to acoustic, speech, or tactile input.

The subject matter described herein may be implemented in a computing system that includes a back-end component, such as for example a data server, or that includes a middleware component, such as for example an application server, or that includes a front-end component, such as for example a client computer having a graphical user interface or a Web browser through which a user may interact with an implementation of the subject matter described herein, or any combination of such back-end, middleware, or front-end components. The components of such a system may be interconnected by any form or medium of digital data communication, such as for example a communication network. Examples of communication networks include a local area network (LAN), a wide area network (WAN), and the Internet. The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:
1. A computer-implemented method comprising:
defining a dynamic region in a plurality of frames of a digital media segment, the digital media segment comprising a portion of a digital media file and being defined by at least two time markers comprising a start time and an end time, the dynamic region containing at least part of a visible feature in the plurality of frames and being moveable from a first of the plurality of frames and a second of the plurality of frames;

analyzing a relationship between an external data set that is collected from one or more subjects viewing the digital media segment and the dynamic region, the analyzing comprising determining a correlation between the defined dynamic region and the external data set to measure at least one of an interest level of the one or more subjects in the digital media segment and an attention level of the one or more subjects to visible features in the digital media segment; and reporting a metric indicative of the at least one of the interest level and the attention level.

2. A computer-implemented method as in claim 1, wherein the defining the dynamic region comprises using an image recognition algorithm to automatically produce a mathematical definition of a screen region containing at least part of the visible feature.

3. A computer-implemented method as in claim 1, further comprising:
incorporating the digital media segment into a digital media presentation in a stochastically determined order.

4. A computer-implemented method as in claim 1, further comprising:
defining a second dynamic region in the digital media segment;
analyzing a relationship between the external data and the second dynamic region in the digital media segment; and
reporting a second metric indicative of a second subject interest level in the second dynamic region.

5. A computer-implemented method as in claim 1, further comprising:
defining a second dynamic region in the digital media segment; and
recording a second metric related to intersection of the dynamic region with the second dynamic region, the second metric comprising at least one of one or more specific points at which the first and second dynamic regions cross and/or overlap, a duration of at least one of the intersection and the crossing and/or overlapping, a frequency with which at least one of the intersection and the crossing and/or overlapping occurs, and a number of repetitions of at least one of the intersection and the crossing and/or overlapping.

6. A computer-implemented method as in claim 1, wherein the external data set comprises at least one of eye-tracking data for the one or more subjects, a cognitive activity measurement of the one or more subjects, a cognitive engagement measurement of the one or more subjects, an emotional response measurement of the one or more subjects, information acquired from an ECG device, information acquired from an EEG device, information acquired from an EKG device, information acquired from a FNIR device, respiration information, information acquired from an EMG device, information acquired from a pupilometry device, and information acquired from a galvanic skin response device.

7. A computer-implemented method as in claim 1, wherein the external data set comprises eye-tracking data for the one or more subjects, the computer-implemented method further comprising:
analyzing a relationship between a second external data set and the dynamic region in the plurality of frames of the digital media segment, the second external data set comprising data collected from one or more subjects viewing the digital media segment and the dynamic region, the second external data set comprising one or more of a cognitive activity measurement of the one or more subjects, a cognitive engagement measurement of the one or more subjects, an emotional response measurement of the one or more subjects, and a physiological response measurement of the one or more subjects, the physiological response measurement comprising information acquired from an ECG device, information acquired from an EEG device, information acquired from an EKG device, information acquired from a FNIR device, respiration information, information acquired from an EMG device, information acquired from a pupilometry device, information acquired from a galvanic skin response device; and
reporting a second metric indicative of one or more of a level of cognitive activity of the one or more subjects, a level of subject cognitive engagement of the one or more subjects, a level of emotional response of the one or more subjects, and a level of one or more physiological reactions of the one or more subjects stimulated by the visible feature.

8. A computer-implemented method as in claim 1, further comprising generating a predicted definition of the dynamic region for an additional frame in the digital media segment in which the dynamic region is not defined.

9. A computer-implemented method as in claim 8, wherein the generating comprises interpolating the predicted definition based on two or more of the plurality of frames.

10. A computer-implemented method comprising:
identifying a visible feature that is displayed in a digital media segment, the digital media segment comprising a portion of a digital media file and being defined by at least two time markers comprising a start time and an end time;
defining a first screen region that contains at least part of the visible feature in a first frame of the digital media segment;
defining a second screen region that contains at least part of the visible feature in a second frame of the digital media segment;
predicting a definition of a third screen region that contains at least part of the visible feature in a third frame based on the definitions of the first screen region and the second screen region;
determining a correlation between the first screen region, the second screen region and the third screen region and an external data set to measure at least one of an interest level of the one or more subjects in the digital media segment and an attention level of the one or more subjects to visible features in the digital media segment, the external data set comprising eye-tracking data collected for one or more subjects while the one or more subjects view the digital media segment; and
reporting a metric indicative of the at least one of the interest level and the attention level.

11. A computer-implemented method as in claim 10, wherein the defining of the first screen region comprises specifying a first location of a vertex point of a polygon in the first frame, and the defining of the second screen region comprises specifying a second location the vertex point in the second frame.

12. A computer-implemented method as in claim 11, wherein the predicting comprises interpolating a third location of the vertex point in the third frame.

13. A computer-implemented method as in claim 10, wherein the third frame appears between the first and the second frames.

14. A computer-implemented method as in claim 10, wherein the defining the first screen region comprises using a image recognition algorithm to automatically produce a mathematical definition of the first screen region that contains at least part of the visible feature.

15. A computer-implemented method as in claim 10, further comprising:
displaying the digital media segment to a subject;
recording a metric pertaining to a location of subject attention in the third frame;
and comparing the location of subject attention with the predicted definition of the third region to estimate subject interest in the visible feature.

16. A computer-implemented method as in claim 10, further comprising:
presenting the digital media segment to the one or more subjects; and
recording the external data related to reactions of the one or more subjects to during viewing by the one or more subject of the digital media segment.

17. A computer-implemented method as in claim 1, wherein the digital media segment comprises a digital video segment.

18. A computer-implemented method as in claim 3, further comprising:
displaying the digital media presentation to the one or more subjects; and
collecting the external data set during the displaying.

19. A computer-implemented method as in claim 10, wherein the digital media segment comprises a digital video segment.

20. A computer-implemented method as in claim 10, further comprising:
analyzing a relationship between a second external data set and the first, the second, and the third screen regions in the digital media segment, the second external data set comprising data collected from one or more subjects viewing the digital media segment, the second external data set comprising one or more of a cognitive activity measurement of the one or more subjects, a cognitive engagement measurement of the one or more subjects, an emotional response measurement of the one or more subjects, and a physiological response measurement of the one or more subjects, the physiological response measurement comprising information acquired from an ECG device, information acquired from an EEG device, information acquired from an EKG device, information acquired from a FNIR device, respiration information, information acquired from an EMG device, information acquired from a pupilometry device, information acquired from a galvanic skin response device; and
reporting a second metric indicative of one or more of a level of cognitive activity of the one or more subjects, a level of subject cognitive engagement of the one or more subjects, a level of emotional response of the one or more subjects, and a level of one or more physiological reactions of the one or more subjects stimulated by the visible feature.

\* \* \* \* \*